US012377925B2

(12) United States Patent
Carracelas et al.

(10) Patent No.: US 12,377,925 B2
(45) Date of Patent: Aug. 5, 2025

(54) SECURING ELECTRIC SCOOTERS

(71) Applicant: Neptune Scooters, San Carlos, CA (US)

(72) Inventors: Javier Gonzalez Carracelas, San Carlos, CA (US); Forrest Jean North, San Carlos, CA (US)

(73) Assignee: Neptune Scooters, San Carlos, CA (US)

( * ) Notice: Subject to any disclaimer, the term of this patent is extended or adjusted under 35 U.S.C. 154(b) by 991 days.

(21) Appl. No.: 17/210,263

(22) Filed: Mar. 23, 2021

(65) Prior Publication Data

US 2021/0300491 A1     Sep. 30, 2021

Related U.S. Application Data

(60) Provisional application No. 62/993,912, filed on Mar. 24, 2020.

(51) Int. Cl.
| | |
|---|---|
| *B62H 3/08* | (2006.01) |
| *B62J 6/057* | (2020.01) |
| *B62K 3/00* | (2006.01) |
| *B62K 11/00* | (2006.01) |
| *B62K 11/02* | (2006.01) |
| *B62K 11/14* | (2006.01) |
| *B62K 19/30* | (2006.01) |
| *B62K 27/12* | (2006.01) |
| *B62M 6/45* | (2010.01) |
| *B62M 6/90* | (2010.01) |
| *B62H 3/00* | (2006.01) |

(52) U.S. Cl.
CPC ............ *B62H 3/08* (2013.01); *B62J 6/057* (2020.02); *B62K 3/002* (2013.01); *B62K 11/00* (2013.01); *B62K 11/02* (2013.01); *B62K 11/14* (2013.01); *B62K 19/30* (2013.01); *B62K 27/12* (2013.01); *B62M 6/45* (2013.01); *B62M 6/90* (2013.01); *B62H 2003/005* (2013.01); *B62H 2700/005* (2013.01); *B62K 2202/00* (2013.01)

(58) Field of Classification Search
CPC ........ B62K 3/002; B62K 11/00; B62K 11/02; B62K 11/14; B62K 19/30; B62K 27/12; B62K 2202/00; B62H 3/08; B62H 2003/005; B62H 2700/005; B62H 3/00; B62H 3/04; B62M 6/45; B62M 6/90; B62J 6/057
See application file for complete search history.

(56) References Cited

U.S. PATENT DOCUMENTS

| | | | | |
|---|---|---|---|---|
| 557,470 | A * | 3/1896 | Young | B62H 3/08 211/20 |
| 653,048 | A * | 7/1900 | Wigg | A47F 7/04 211/24 |
| 731,651 | A * | 6/1903 | Allen | B62H 3/08 211/20 |

(Continued)

*Primary Examiner* — Devin K Barnett
(74) *Attorney, Agent, or Firm* — AMPACC Law Group, PLLC

(57) ABSTRACT

In some embodiments, a docking station includes a scooter locking section that allows the electric scooter to be removed from the docking station when the electric scooter is in a non-rotated orientation and prevents the electric scooter to be removed from the docking station when the electric scooter is in a rotated orientation.

13 Claims, 16 Drawing Sheets

(56) References Cited

U.S. PATENT DOCUMENTS

| | | | | |
|---|---|---|---|---|
| 1,250,937 | A * | 12/1917 | Achert | A47F 7/04 211/24 |
| D58,504 | S * | 7/1921 | Rancel | 211/23 |
| 1,428,223 | A * | 9/1922 | Fairbanks | A47F 7/04 211/24 |
| 1,628,306 | A * | 5/1927 | Clark | A47F 7/04 211/24 |
| 1,665,887 | A * | 4/1928 | Lind | A47F 7/04 211/24 |
| 1,812,781 | A * | 6/1931 | Gibbs | A47F 7/04 211/24 |
| 1,901,475 | A * | 3/1933 | Shank | A47F 7/04 211/24 |
| 1,917,596 | A * | 7/1933 | Mullen | A47F 7/04 211/24 |
| 2,100,077 | A * | 11/1937 | Harrison | A47F 7/04 248/173 |
| 2,915,850 | A * | 12/1959 | Goodfellow | A47B 91/12 248/346.11 |
| 3,820,662 | A * | 6/1974 | Steers | B62H 3/00 211/5 |
| 3,881,680 | A * | 5/1975 | Lietaert, Jr. | E05B 71/00 D12/115 |
| 3,942,646 | A * | 3/1976 | Nelson | B62H 5/003 211/20 |
| 4,033,459 | A * | 7/1977 | Zach | B62H 3/10 211/20 |
| 4,050,583 | A * | 9/1977 | Szabo | B62H 3/08 211/20 |
| 4,262,899 | A * | 4/1981 | Alvarez | A63B 21/00069 482/61 |
| 4,306,660 | A * | 12/1981 | Livingston | B62H 3/04 211/20 |
| 4,437,597 | A * | 3/1984 | Doyle | B60R 9/10 211/23 |
| 4,662,617 | A * | 5/1987 | Ditterline, Jr. | B25H 1/0014 269/134 |
| D298,524 | S * | 11/1988 | De Luca | D12/115 |
| 4,856,659 | A * | 8/1989 | Krebs | A47F 7/04 211/23 |
| 5,078,277 | A * | 1/1992 | Tschritter | B62H 3/08 211/20 |
| 5,133,461 | A * | 7/1992 | Martinell | B62H 3/04 211/198 |
| D328,882 | S * | 8/1992 | Martinell | D12/115 |
| 5,267,657 | A * | 12/1993 | McGuiness | B62H 3/08 211/73 |
| 5,301,817 | A * | 4/1994 | Merritt | B62H 3/04 211/20 |
| D359,466 | S * | 6/1995 | Eggers | D12/115 |
| 5,702,007 | A * | 12/1997 | Fritz | B62H 3/08 211/20 |
| 5,743,411 | A * | 4/1998 | Hawkes | B62H 3/04 211/20 |
| 5,749,475 | A * | 5/1998 | Krebs | A47F 7/04 211/23 |
| 5,862,921 | A * | 1/1999 | Venegas, Jr. | A47F 10/04 211/17 |
| 6,062,396 | A * | 5/2000 | Eason | A47F 7/04 211/20 |
| 6,331,094 | B1 * | 12/2001 | Burrows | B60P 3/077 410/3 |
| 6,364,269 | B1 * | 4/2002 | Hofer | B62H 3/08 211/20 |
| 6,640,979 | B1 * | 11/2003 | Mayfield | B62H 3/04 211/20 |
| D486,534 | S * | 2/2004 | Ueda | D21/664 |
| 6,863,481 | B2 * | 3/2005 | Pingel | B60P 3/077 224/924 |
| 6,948,621 | B1 * | 9/2005 | Lassanske | B62H 3/06 211/21 |
| 7,083,551 | B1 * | 8/2006 | Lassanske | A63B 69/16 482/61 |
| 7,150,359 | B1 * | 12/2006 | Lyons | B62H 3/08 211/20 |
| 7,407,466 | B2 * | 8/2008 | Chiu | A63B 69/16 482/61 |
| D595,618 | S * | 7/2009 | Dallaire | D12/115 |
| 7,690,516 | B1 * | 4/2010 | Crump | B62H 3/12 211/19 |
| 7,722,004 | B2 * | 5/2010 | Holden | B29C 51/10 248/346.01 |
| D634,674 | S * | 3/2011 | Finbow | D12/115 |
| 8,104,588 | B2 * | 1/2012 | Curlee | B62H 3/08 211/20 |
| 8,485,369 | B2 * | 7/2013 | Glover | B60P 3/073 211/24 |
| 9,409,508 | B2 * | 8/2016 | Graham | B62H 3/04 |
| D766,138 | S * | 9/2016 | Arbour | D12/115 |
| 10,569,689 | B2 * | 2/2020 | Johnson | B60P 3/06 |
| 10,919,405 | B2 * | 2/2021 | Moravick | B60L 3/0046 |
| 11,117,631 | B2 * | 9/2021 | Gu | B62H 3/08 |
| D933,541 | S * | 10/2021 | Fournier | D12/115 |
| D941,191 | S * | 1/2022 | Hageman | D12/115 |
| 11,279,250 | B2 * | 3/2022 | North | B60L 53/30 |
| 11,772,729 | B1 * | 10/2023 | Yang | B62H 5/06 211/22 |
| 2002/0030339 | A1 * | 3/2002 | Powers | B62J 6/045 188/19 |
| 2006/0191858 | A1 * | 8/2006 | Posner | A47F 10/04 211/20 |
| 2006/0237376 | A1 * | 10/2006 | Eakin | B60P 3/077 211/20 |
| 2007/0138112 | A1 * | 6/2007 | Meyer | B66F 7/243 211/24 |
| 2008/0223800 | A1 * | 9/2008 | Cole | B62H 3/04 211/22 |
| 2009/0266673 | A1 * | 10/2009 | Dallaire | G07F 17/10 70/262 |
| 2011/0037240 | A1 * | 2/2011 | Kritzer | E05B 51/02 211/20 |
| 2011/0094976 | A1 * | 4/2011 | Pratt | B62H 3/10 211/20 |
| 2012/0196631 | A1 * | 8/2012 | Fajstrup Axelsen | G06Q 20/325 340/5.5 |
| 2013/0092645 | A1 * | 4/2013 | Kedar | B62H 3/04 211/20 |
| 2013/0228535 | A1 * | 9/2013 | Wood | B62H 3/04 211/5 |
| 2014/0083960 | A1 * | 3/2014 | Weeks | B62H 3/08 211/20 |
| 2014/0183147 | A1 * | 7/2014 | Chiu | B62H 3/00 211/17 |
| 2014/0284288 | A1 * | 9/2014 | Huntington | B62H 3/04 211/20 |
| 2016/0137244 | A1 * | 5/2016 | Paulssen | B62H 3/00 211/20 |
| 2018/0215428 | A1 * | 8/2018 | Laight | B62H 3/04 |
| 2019/0263281 | A1 * | 8/2019 | Wang | B60L 53/60 |
| 2020/0331551 | A1 * | 10/2020 | Errickson, Jr. | B62H 5/145 |
| 2021/0179215 | A1 * | 6/2021 | Henricksen | B62H 3/08 |
| 2021/0206279 | A1 * | 7/2021 | North | H02J 7/0045 |
| 2023/0008484 | A1 * | 1/2023 | North | B60L 53/16 |
| 2023/0192205 | A1 * | 6/2023 | Rasmussen | B62H 3/04 211/20 |
| 2023/0322316 | A1 * | 10/2023 | Demers | B62H 3/08 211/20 |

* cited by examiner

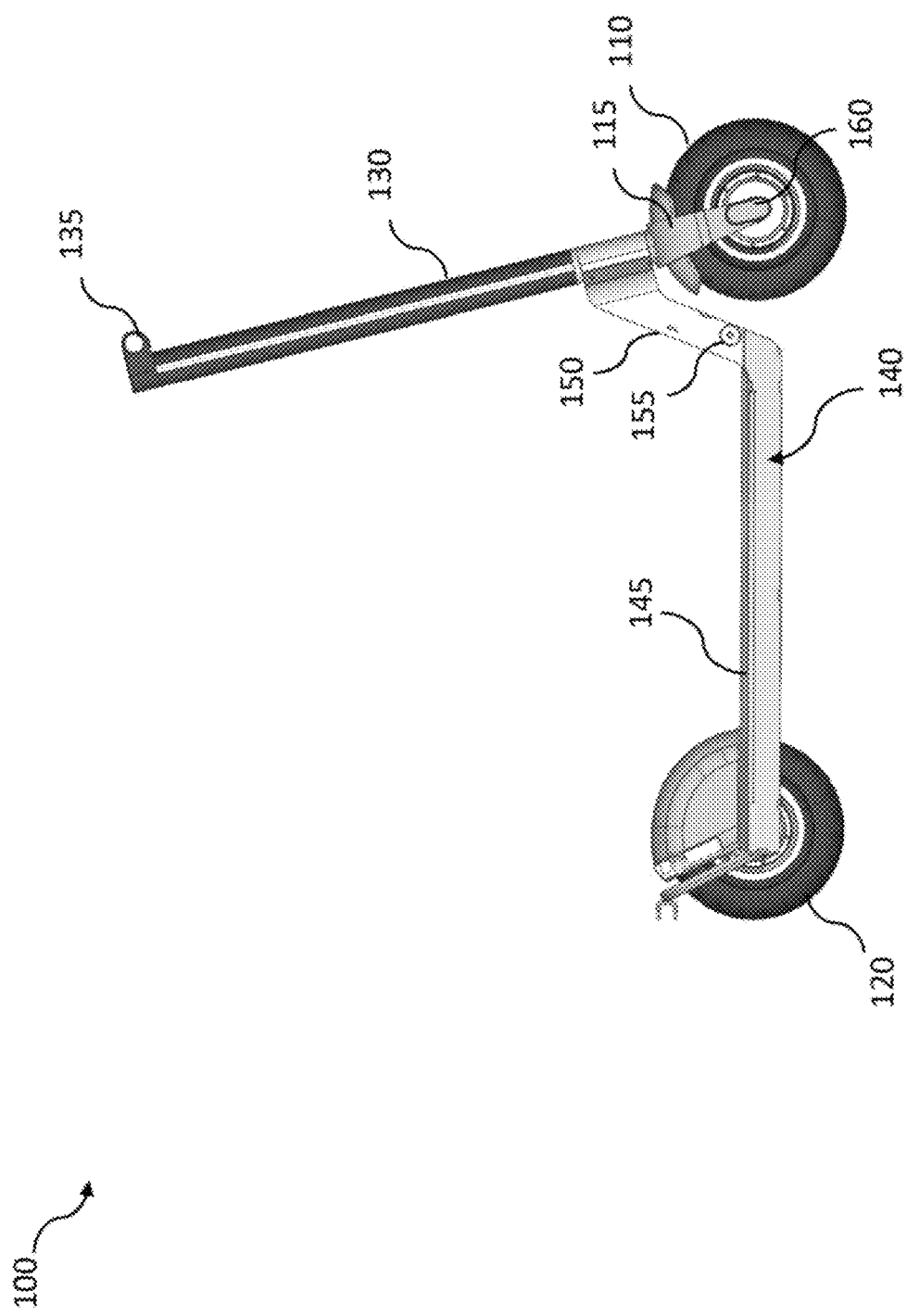

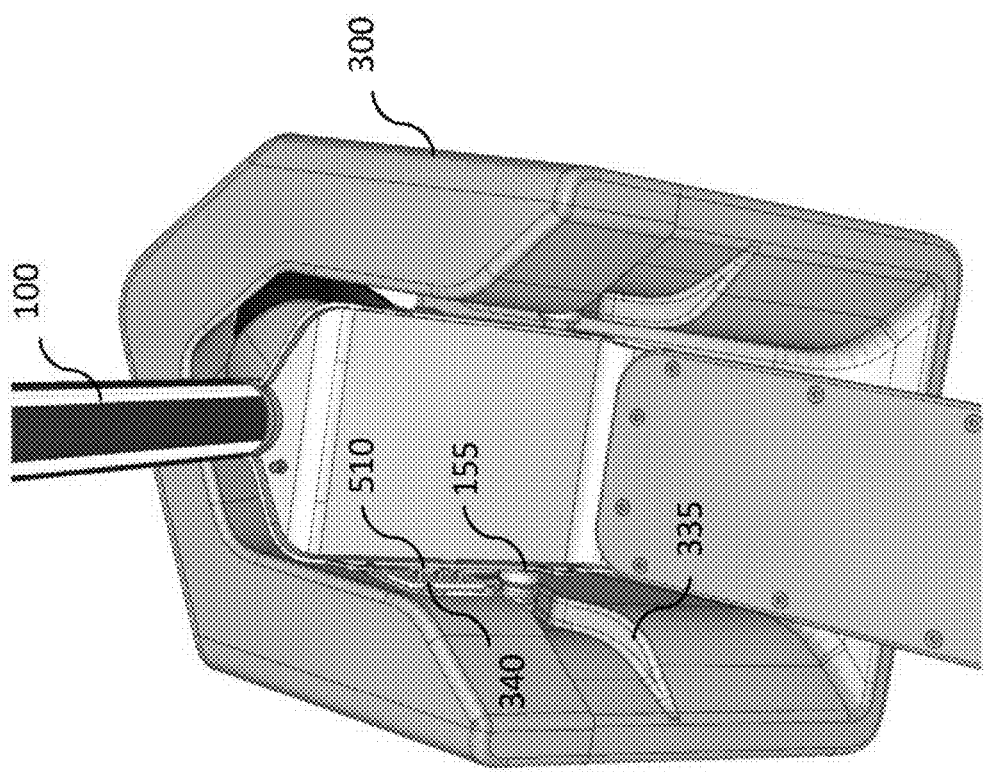

SECURING ELECTRIC SCOOTERS

CROSS REFERENCE TO RELATED APPLICATIONS

This application claims priority to U.S. Provisional Patent Application No. 62/993,912, filed on Mar. 24, 2020, entitled ELECTRIC SCOOTERS AND ASSOCIATED SYSTEMS, which is incorporated by reference in their entirety.

BACKGROUND

There are many ways to get around a city. A person can walk, drive, travel by bus, tram, subway, taxi, or hire a car share service. A person can also rent or use various individual modes of transportation, such as mopeds, bikes (e.g., e-bikes or ebikes), scooters, skateboards (electric skateboards) and/or other micro-mobility vehicles or devices. For example, many cities provide residents and visitors with bike share and scooter share services, such as services that enable people to rent bikes or electric scooters when traveling short distances within a city.

While these services provide people with numerous benefits, current installations and provisioning of bike and scooter shares suffer from various drawbacks. For example, services that provide the docking of bikes can take up a large footprint within a city or neighborhood, such as in areas where any extra space can be utilized for parking, footpaths, and so on. As another example, services that provide dockless bikes and scooters enable users to simply leave their rented bikes and scooters in the middle of sidewalks, in yards, and other undesirable locations. Further, the vehicles are often stolen or broken.

These and other drawbacks exist with respect to electric scooters and electric scooter share services.

BRIEF DESCRIPTION OF THE DRAWINGS

FIGS. 1A-1B are diagrams illustrating an example electric scooter.

FIGS. 5A-5D are diagrams illustrating the entry of an electric scooter into a single scooter docking station.

Figure 1B:
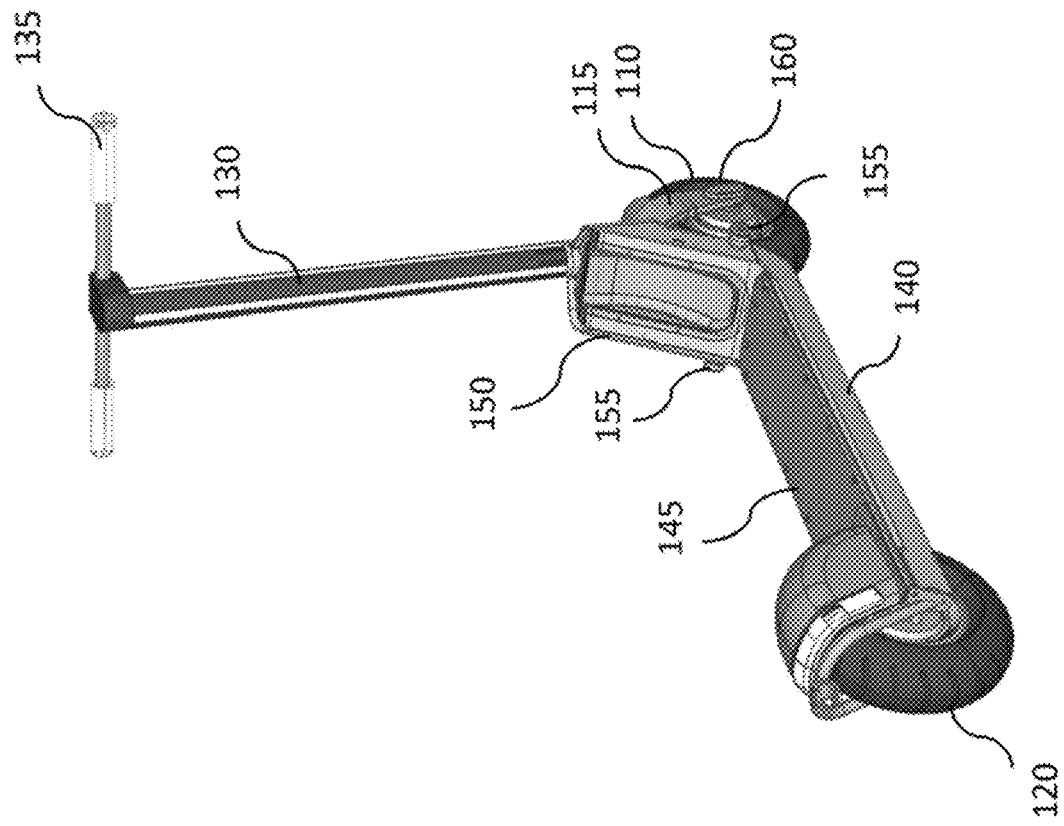

In the drawings, some components are not drawn to scale, and some components and/or operations can be separated into different blocks or combined into a single block for discussion of some of the implementations of the present technology. Moreover, while the technology is amenable to various modifications and alternative forms, specific implementations have been shown by way of example in the drawings and are described in detail below. The intention, however, is not to limit the technology to the particular implementations described. On the contrary, the technology is intended to cover all modifications, equivalents, and alternatives falling within the scope of the technology as defined by the appended claims.

DETAILED DESCRIPTION

Overview

Docking stations that dock single electric scooters, and various components for securing or locking electric scooters are described. In some embodiments, docking stations are designed and configured to dock an electric scooter in a secure and efficient manner, without the use of complex locking or storage components, among other benefits.

In some embodiments the docking station includes a scooter entry section, having an entry ramp that facilitates entry of an electric scooter into the docking station and side walls that surround the entry ramp to form an opening through which the electric scooter enters the docking station. Further, the docking station includes a scooter locking section positioned proximate to the scooter entry section, providing a rotation area that facilitates lateral rotation or turning of a front wheel of the electric scooter when the electric scooter is positioned within the scooter locking section, and a locking component that prevents the electric scooter from being removed from the scooter locking section when the electric scooter is positioned within the scooter locking section and the front wheel of the electric scooter is locked in an angled orientation.

In some embodiments, an apparatus for docking an electric scooter includes an entry ramp that facilitates entry of an electric scooter, side walls that surround the entry ramp, a rotation area positioned proximate to the entry ramp that facilitates lateral rotation or turning of a front wheel of the electric scooter, and a lock bar that prevents the electric scooter from being removed from the rotation area when the electric scooter is positioned within the rotation area and the front wheel of the electric scooter is locked in an angled orientation.

In some embodiments, a docking station includes a scooter locking section that allows the electric scooter to be removed from the docking station when the electric scooter is in a non-rotated orientation and prevents the electric scooter to be removed from the docking station when the electric scooter is in a rotated orientation.

In the following description, for the purposes of explanation, numerous specific details are set forth in order to provide a thorough understanding of implementations of the present technology. It will be apparent, however, to one skilled in the art that implementations of the present technology can be practiced without some of these specific details. The phrases "in some implementations," "according to some implementations," "in the implementations shown," "in other implementations," and the like generally mean the particular feature, structure, or characteristic following the phrase is included in at least one implementation of the present technology and can be included in more than one implementation. In addition, such phrases do not necessarily refer to the same implementations or different implementations.

Examples of Securing Electric Scooters

Several implementations of securing electric scooters are discussed below in more detail with reference to the figures.

Examples of Suitable Electric Scooters

FIGS. 1A-1B depict an electric scooter 100 suitable for use with the docking stations described herein. The electric scooter 100 is generally a powered stand-up scooter, propelled by an electric motor. Electric scooters can also be referred to as electric kick scooters, e-scooters, motorized scooters, and so on. Typically, an electric scooter includes two (or three) small wheels (e.g., hard or solid tires, air tires, foam filled tires), such as a front wheel 110 and a rear wheel 120. Further, the electric scooter 100 includes a foldable or non-foldable steering tube 130 that supports handlebars 135 and a fork 115 that fixes the front wheel 110 to the scooter 100.

The scooter 100 also includes a chassis 140 having a deck 145 that supports a rider of the scooter 100 (e.g., the rider stands on the deck 145). The scooter 100 can also include a down tube connected to a head tube, inside of which turns the steering tube 130 connected to a stem attached to the handlebars 135. In addition, the electric scooter 100 can include fenders, trailer hitches, brakes, lights, and other accessories or components.

The electric scooter 100 can include a housing 150 that contains a transmission or drive system, a control system, a braking system, a suspension, and a battery, and an electric motor 160, such as a front wheel hub motor. In some cases, some or all of the components or systems can be contained by the housing 150, the chassis 140, or both. A charging post or port 155 is attached to the housing 150.

Further, the electric scooter 100 can include a wheel lock or other locking component, which is disposed proximate to the front wheel 110 at a position on the steering tube 130, that prevents rotation of the steering tube 130, and thus the front wheel 110, when in a locked position. Further details regarding the wheel lock are described herein, such as with respect to FIGS. 6A-6B.

The electric scooter 100 may also include various computing systems and components, such as the various computing systems described herein, GPS or positioning systems, communication components, and so on. For example, an electric scooter can include computing systems and identification components that facilitate or enable the electric scooter as an Internet of Things (e.g., IoT) device networked to other scooters and one or more control or communication systems.

The systems, components, and techniques introduced here can be implemented by electric scooters, docking stations, and/or associated systems as or via special-purpose hardware (for example, circuitry), as programmable circuitry appropriately programmed with software and/or firmware, or as a combination of special-purpose and programmable circuitry. Hence, implementations can include a computer- or machine-readable medium having stored thereon instructions which can be used to program a computer (or other electronic devices) to perform a process. The machine-readable medium can include, but is not limited to, floppy diskettes, optical discs, compact disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other types of media/machine-readable medium suitable for storing electronic instructions.

Figure 2:
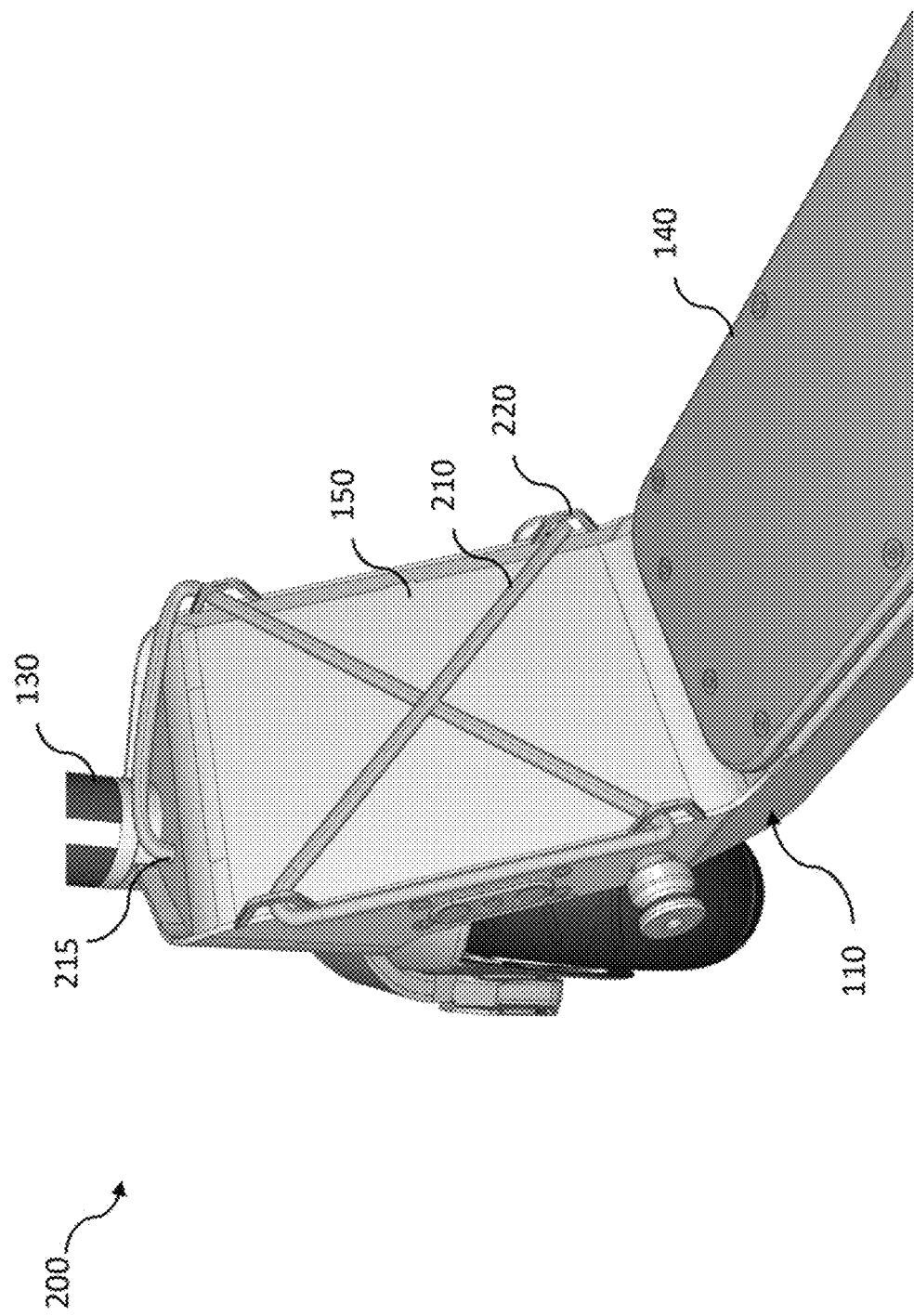
FIG. 2 is a diagram illustrating an electric scooter having an integrated locking assembly.

In some embodiments, the electric scooter 100 includes an integrated lock, such as a cable lock, that facilitates securing the scooter 100 to a fixed object at a location, as well as holding or containing objects for a rider when the scooter 100 is in use. FIG. 2 is a diagram illustrating an electric scooter 200 having an integrated locking assembly.

The electric scooter 200, which can be similar to the electric scooter 100, includes a cable lock 210 that is attached at one end 215 to the scooter 100 (e.g., to the housing of the scooter 200). When used to lock the scooter 200 to an object at a location (e.g., a rack, post, tree, fence, and so on), the cable lock 210 extends away from the scooter 200 and is fixed to the object. For example, the cable lock 210 can wrap around the object and be secured to the object, the lock 210 itself, and/or to an attachment component of the scooter 200.

When not used to lock the scooter 200, such as when a user is riding the scooter 200, the cable lock 210 wraps in a X-shape (or other shape) around support clamps 220 or latches. For example, the housing 150 can include multiple (e.g., four) clamps 220 or attachment points that accommodate the wrapping of the cable lock 210 into the X-shape or other desired shapes.

In such a configuration, the cable lock 210 can flex and accommodate the storage or containment of objects for the user, such as a bag, water bottle, clothing, groceries, and so on. Thus, the cable lock 210, which is formed of a secure, yet flexible material (e.g., a steel cable core wrapped in a flexible coating or covering) provides a strong cable for securing the scooter 200 when not in use, and also provides a durable storage location for the scooter 200 when the scooter 200 is being driven by a rider.

Examples of Single Scooter Docking Stations

As described herein, in some embodiments, a single scooter docking station facilitates the docking of an electric scooter in an efficient yet secure manner. FIGS. 3A-3D are diagrams illustrating a single scooter docking station 300. As depicted, the docking station 300 has a housing 302 that includes a scooter entry section 305 via which an electric scooter enters the docking station 300, and a scooter locking section 315, via which the electric scooter is fixed, stored, or secured within the docking station 300. As described herein, the electric scooter can include a wheel lock that, when in a locked position, prevents the steering tube from rotating or turning when locked in an angled orientation, and thus the scooter cannot be removed from the docking station 300.

The scooter entry section 305 includes an entry ramp 330 that facilitates entry of an electric scooter into the docking station 300, and side walls 310 that surround the entry ramp 330 to form an opening through which the electric scooter enters the docking station 300. In some cases, the side walls 310 extend to form a portion of the scooter locking section 315 (surrounding an internal area of the scooter locking section 315).

The scooter locking section 315, which is positioned or disposed proximate to the scooter entry section 305 includes an internal area (e.g., a wheel rotation area or wheel turning area) that facilitates lateral rotation or turning of a front wheel of an electric scooter when the electric scooter is positioned within the scooter locking section 315. The rotation area, as depicted, is formed of the side walls 310 and a rear opening 322.

The scooter locking section 315 also includes a locking component 320 (e.g., a lock bar or top bar) that prevents the electric scooter from being removed from the scooter locking section 315 when the electric scooter is positioned within the scooter locking section 315 and the front wheel of the electric scooter is locked in an angled orientation. The locking component 320, in some cases, is attached to a location or position of the side walls 310 at the rotation area of the scooter locking section 315 to partially enclose the rotation area from above. In such a configuration, the locking component 320 is a top bar, arm, or wall that fixes the front wheel of an electric scooter within the scooter locking section 315.

Figure 3A:
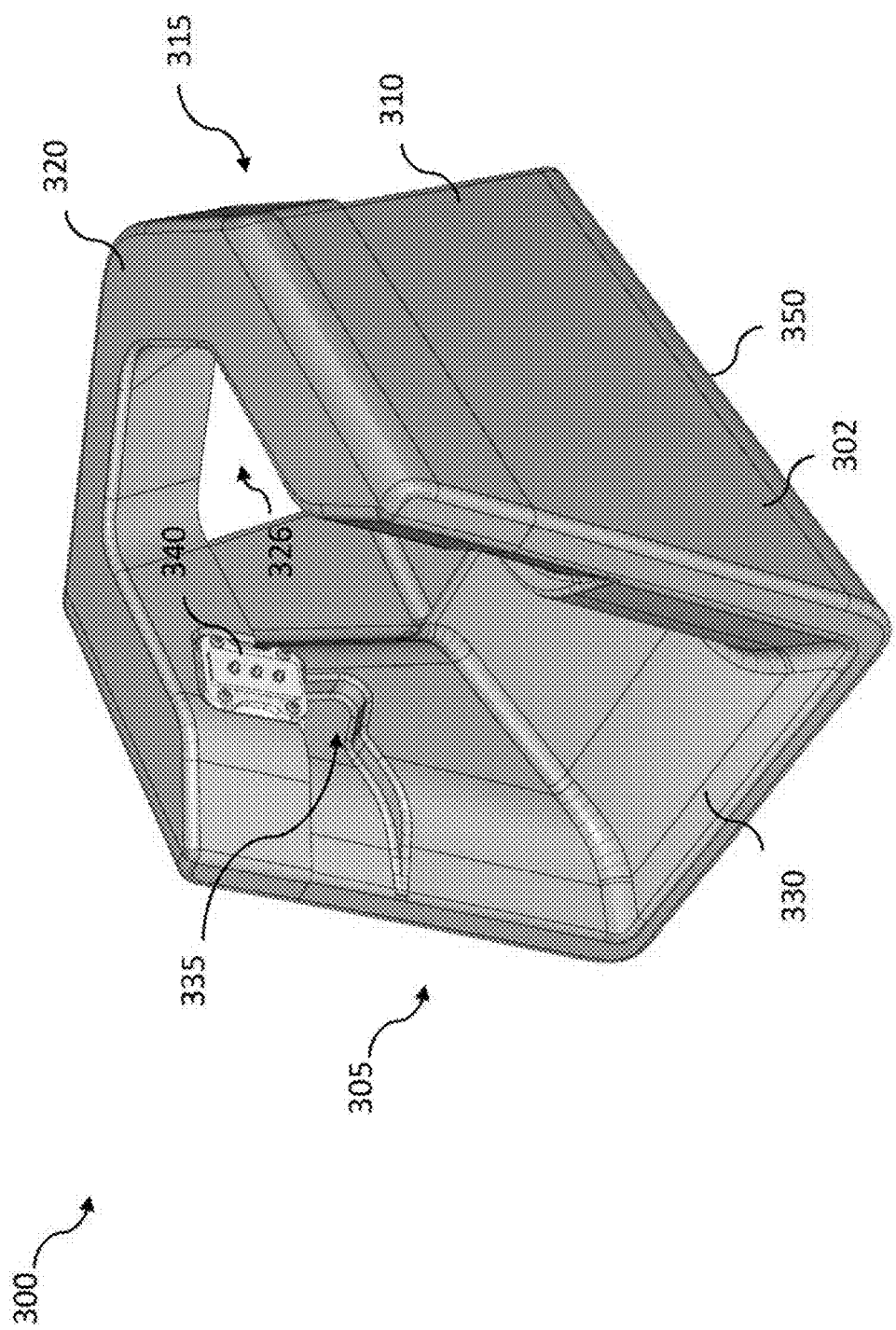
FIGS. 3A-3D are diagrams illustrating a single scooter docking station.
Figure 3B:
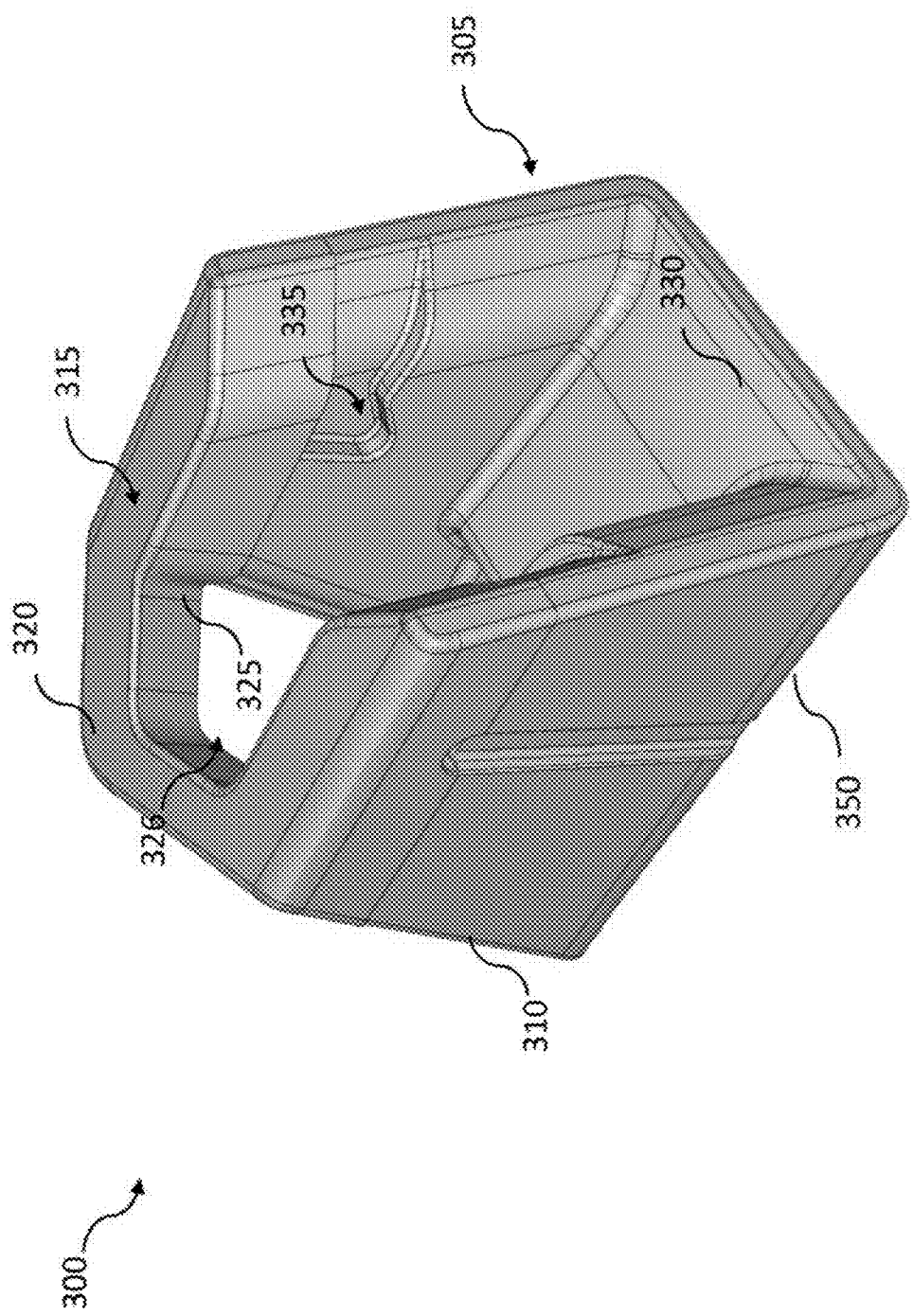
Figure 3C:
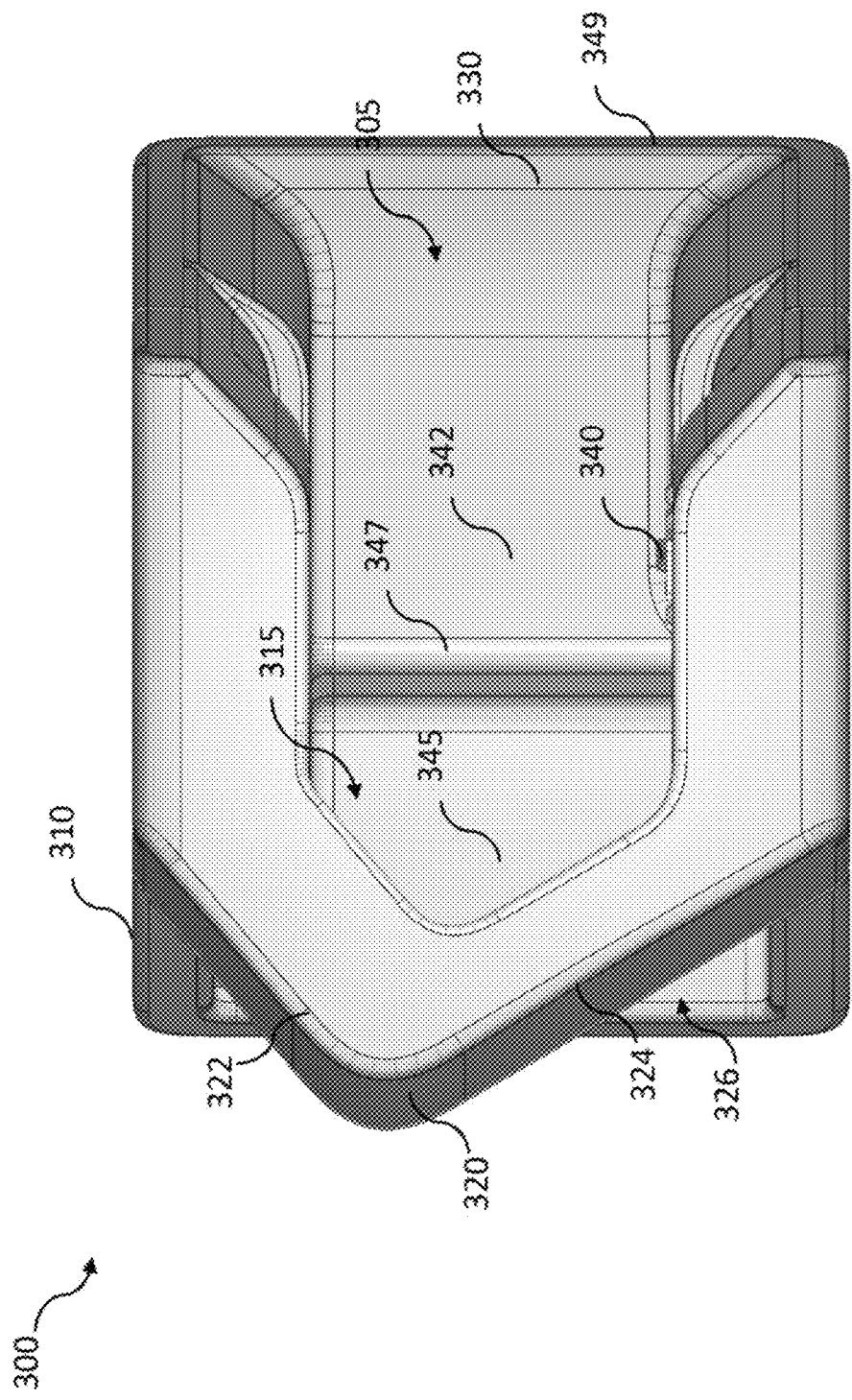
Figure 3D:
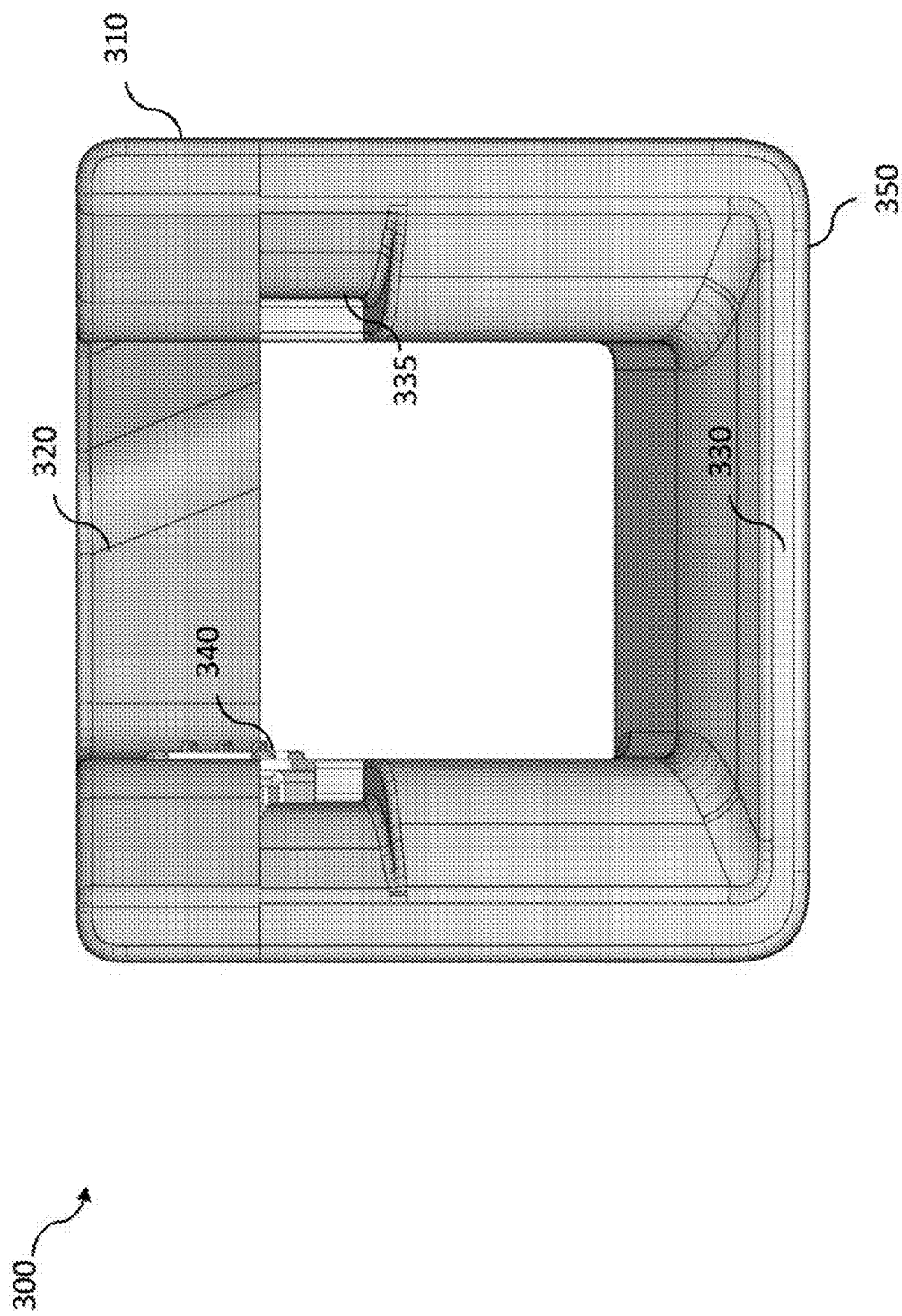

In some cases, the locking component 320 is a top bar having a V-shaped configuration (see the top view of docking station 300 depicted in FIG. 3C). The V-Shaped locking component 320 can include a long bar portion 324 and a short bar portion 322 (or other asymmetrical geometries or shapes). When an electric scooter is locked in an angled orientation within the docking station 300, the front wheel of the electric scooter is positioned below the short bar portion 322 (and fixed to the rotation area by the short bar portion 322 of the locking component 320).

In some cases, a floor 342 of the entry ramp 330 is at a level that is higher than a floor 345 of the rotation area of the scooter locking section 315. For example, the floor 342 of the entry ramp 330 has a ramp shape, providing an inclined entry as the electric scooter travels through the scooter entry section 305 towards the scooter locking section 315. The floor can include a ramp lip 347, where the floor inclines or rises from a flat level surface at an entry point 349 of the entry ramp 330 to a raised level at the ramp lip 347. In such cases, the entry ramp 330 is inclined at an angle (e.g., 15 degrees) that rises above a level of the floor 345 of the rotation area of the scooter locking section 315.

Thus, the docking station 300 provides an opening through which an electric scooter enters the docking station 300 that is positioned or located proximate to an internal area that facilitates lateral or side to side rotation of the front wheel of the electric scooter when docked (e.g., turning of the steering tube 130 to laterally rotate or turn the wheel). That internal area, in some embodiments, is defined by the side walls 310 of the scooter entry section 305 that extend away from the entry ramp 330, a top bar (e.g., the locking component 320) that attaches to the side walls 310 and extends between the side walls 310 to form an upper height of the rotation area, and the floor 345 that is attached to and extends between the side walls 310 to form a surface of the rotation area upon which the front wheel of the electric scooter is positioned, where the floor 345 is at a level that is lower than a level of a floor 342 of the entry ramp 330 of the scooter entry section 305.

Thus, in some cases, the scooter locking section 315 has an internal geometry that allows the electric scooter to be removed from the rotation area when the electric scooter is in a non-rotated orientation and prevents the electric scooter to be removed from the rotation area when the electric scooter is in a rotated orientation. The rotation area facilitates lateral (e.g., side to side) rotation of the front wheel of the electric scooter to various angles, such as angles including 0-45 degrees from an axis defined by the electric scooter.

In some embodiments, the docking station 300 includes components that facilitate the charging of a docked electric scooter. For example, the docking station 300 can include a charging contact 340, disposed on a surface (e.g., an internal surface) of one of the side walls 310, that contacts a charging port of the electric scooter (e.g., charging ports 155 of electric scooter 100) when the electric scooter is docked in the docking station 300 to facilitate charging a battery of the electric scooter by the docking station 300. The docking station 300 can include internal batteries or can be coupled to a power grid or other external power sources.

To accommodate the moving and docking of an electric scooter having charging ports or other similar components, the docking station 300 includes side channels 335 or grooves disposed within the side walls 310 of the scooter entry section 305 and configured or adapted to receive a charging port of the electric scooter (e.g., charging ports 155 of electric scooter 100) when the electric scooter travels through the docking station 300.

In some cases, the housing 302 of the docking station 300 is disposed on or otherwise fixed to a base 350. The base 350 prevents removal of the docking station 300 from a location within which the docking station 300 provides docking for electric scooters. For example, the base 350 can include materials (e.g., concrete, steel, and so on), that cause the docking station 300 to be heavy, enabling the station 300 maintain an upright orientation while also preventing easy or quick removal during a theft attempt. Further, the base 350 can include various components configured to fix the docking station 300 to the ground, such as foundation screws or other fasteners.

The docking station 300 can also include various computing systems, such as a computing system that performs various actions, method, and/or techniques associated with scooters within or external to a docking station. The computing systems can interact with various external or networked computing systems, such as systems provided by remote or cloud services or locations. Further, the computing system of a docking station can wirelessly communicate with one or more docked electric scooters or other docking stations over various protocols, including Wi-Fi, Bluetooth, and other wireless protocols, near field communication protocols (such as when a scooter is docked), and so on.

Also, in some embodiments, communications between the docking stations and various components (or associated scooters) may be performed over wired connections, including various power lines or connections. Further, as described herein, in some cases, the docking stations can be simple structures that are configured to docking and store electric scooters, but provide no power, charging, or communications functions for the electric scooters themselves.

Figure 4A:
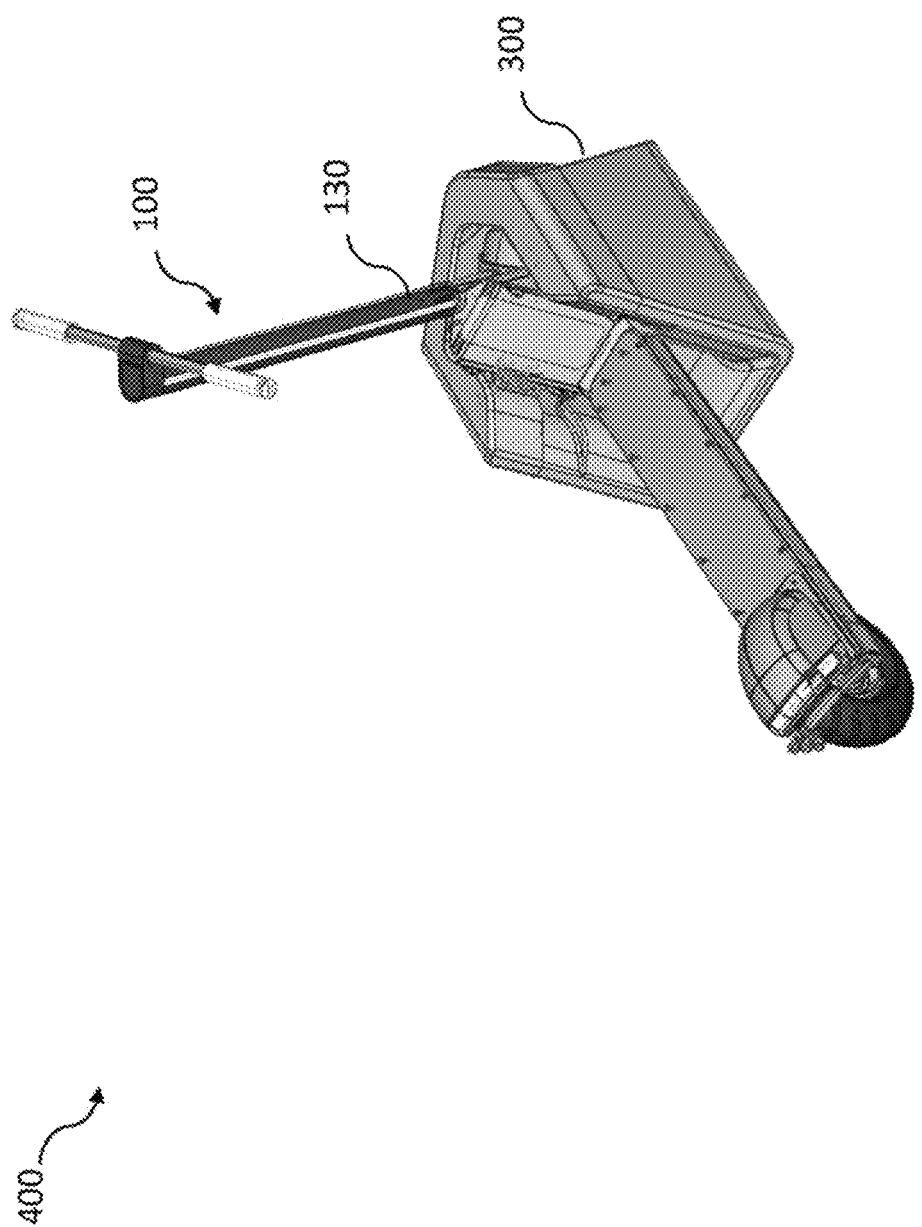
FIGS. 4A-4D are diagrams illustrating an electric scooter docked within a docking station.
Figure 4B:
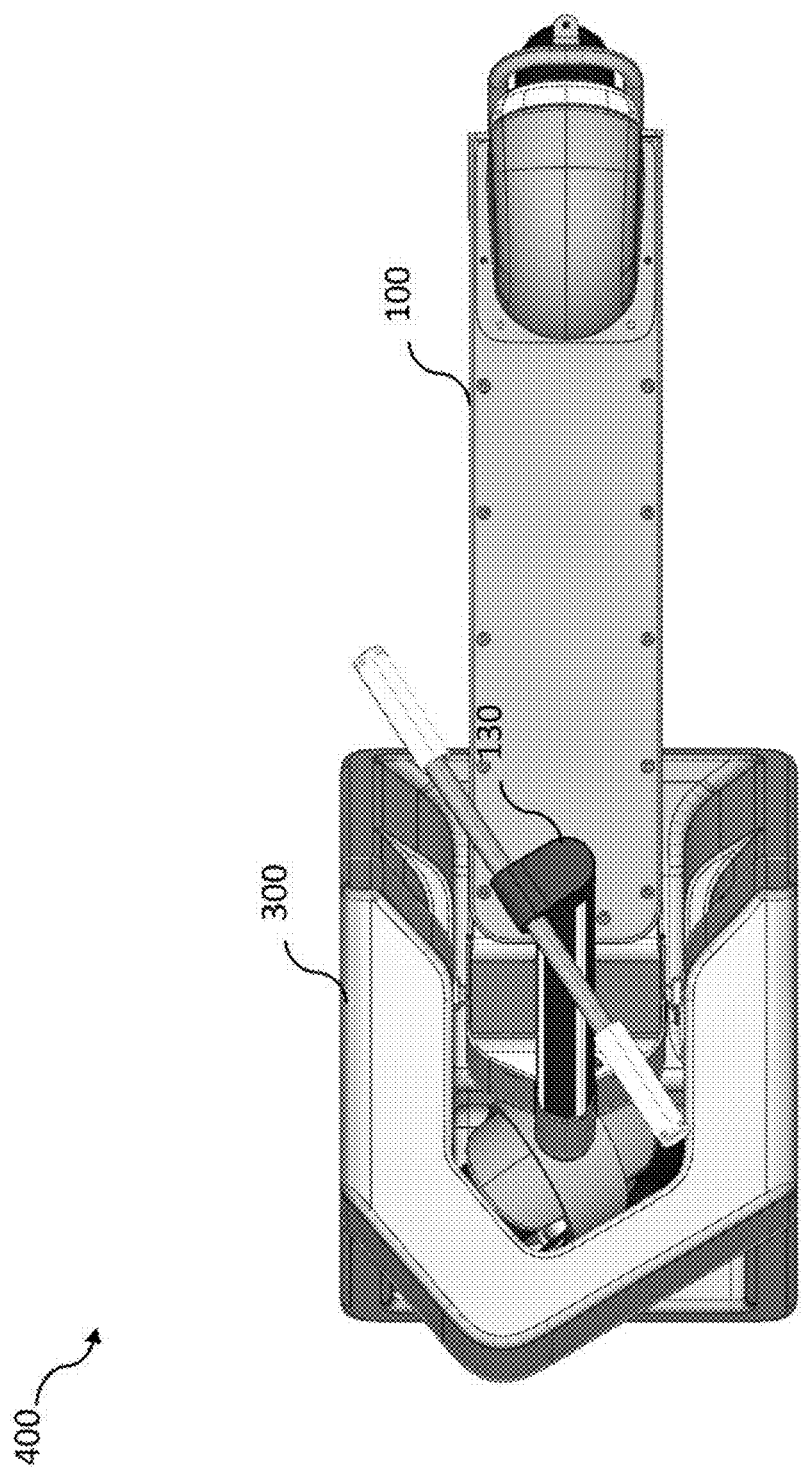

FIGS. 4A-4D are diagrams 400 illustrating an electric scooter docked within a docking station, such as docking station 300. As depicted in FIGS. 4A-4B, the electric scooter 100 is docked into the docking station 300, with the steering tube 130 turned at an angle, securely fixing the electric scooter 100 into the docking station 300.

Figure 4C:
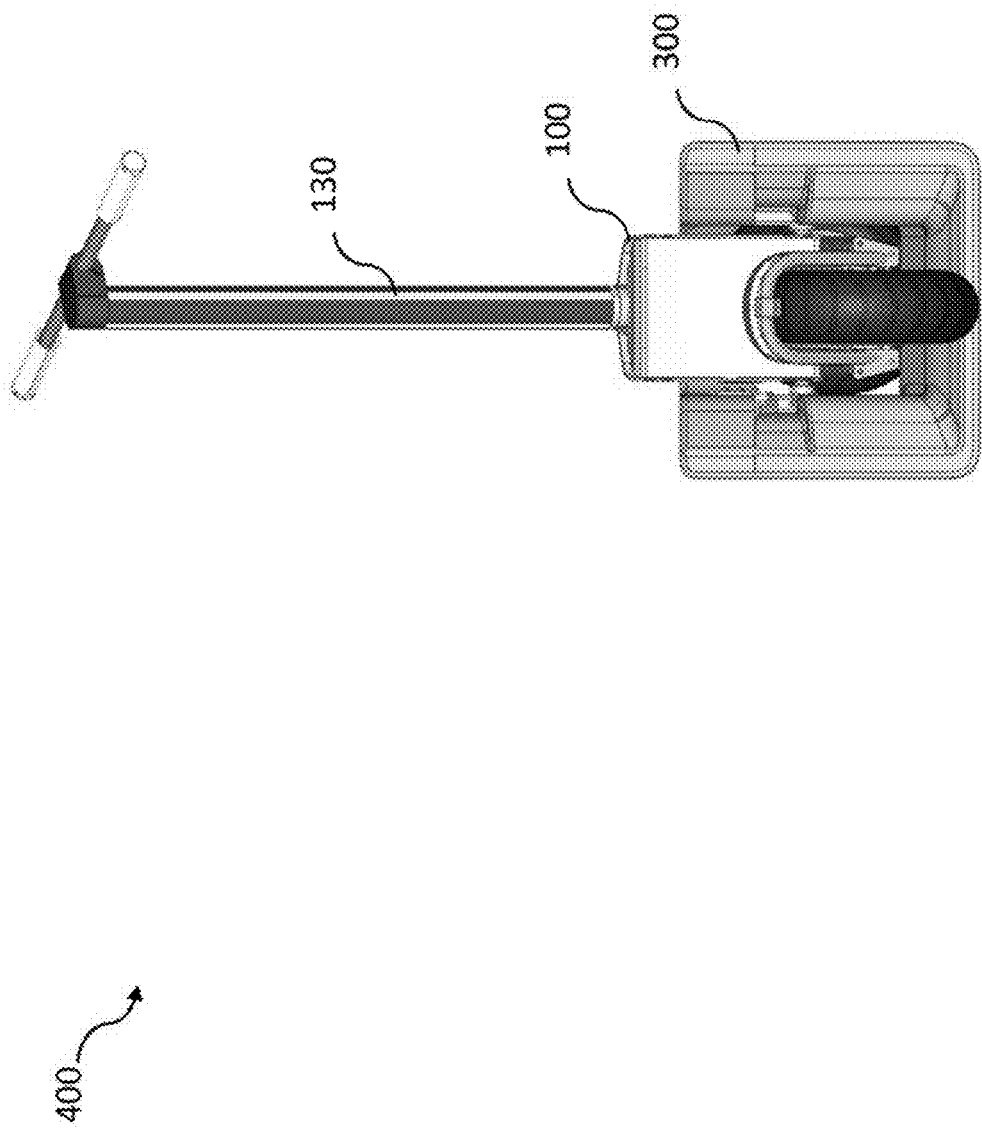
Figure 4D:
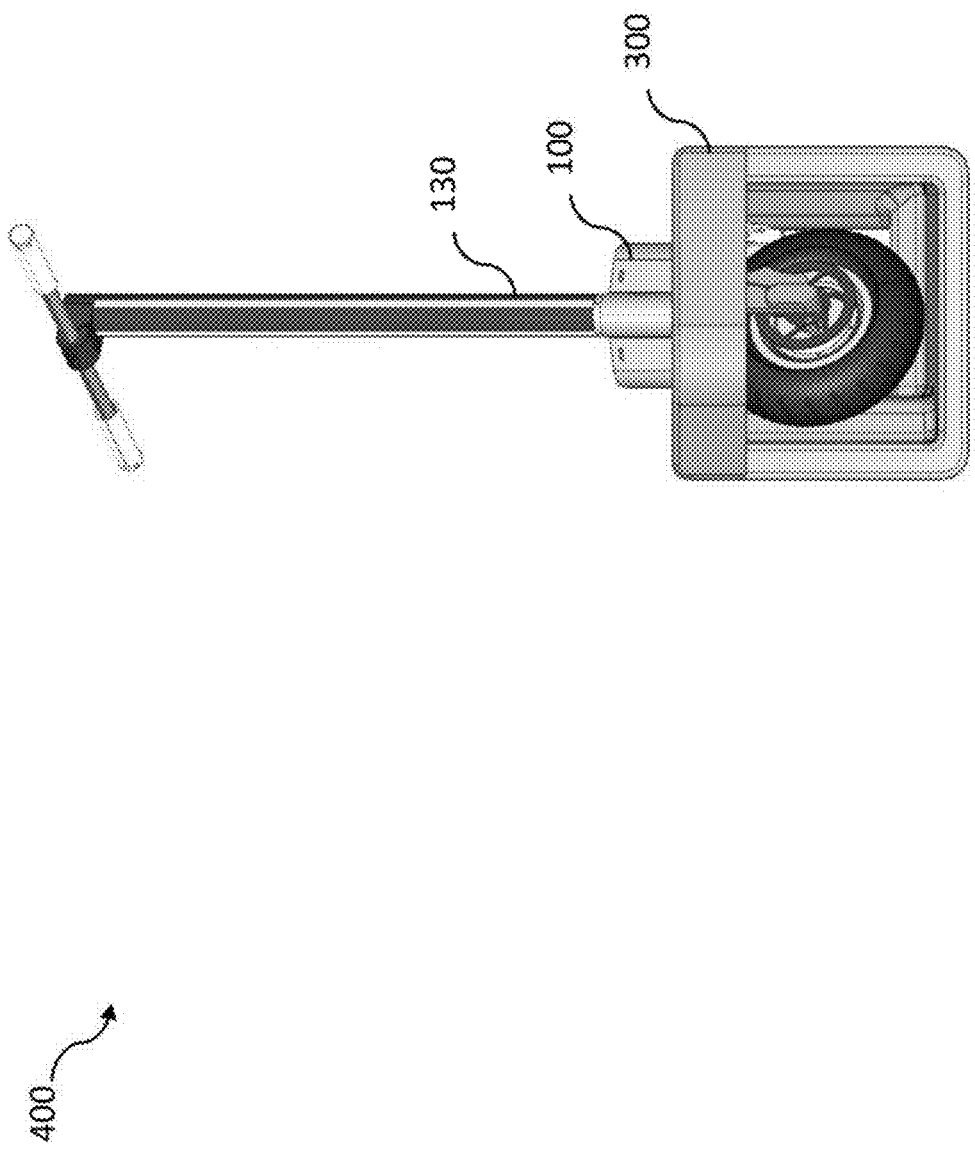

FIGS. 4C-4D illustrate the process of docking the electric scooter 100 into the docking station 300. In FIG. 4C, the electric scooter 100 enters the docking station 300 and is pushed up the entry ramp 330 until the front wheel of the electric scooter 100 is disposed within the rotation area (the internal area) of the scooter locking section 315. For example, the front wheel travels up the entry ramp 330, dropping into the rotation area (and onto the floor 345 of the rotation area. The front wheel, in a non-turned orientation (pointing directly ahead), is not yet secured into the docking station 300, because the V-shape of the locking component 320 (the top bar) allows for upward or vertical movement of the front wheel in such an orientation.

In FIG. 4D, the steering tube 130 of the electric scooter 100 has been turned or rotated, causing the electric scooter 100 to be positioned at an angle orientation (facing in part towards one of the side walls 310). In the turned orientation, the front wheel is secured within the rotation area, and thus the docking station 300, because it is fixed by the locking component 320, the entry ramp 330 (via the ramp lip 347), and the side walls 310. Thus, when the electric scooter 100 is locked (via a wheel lock or other mechanism that prevents the front wheel from rotating), the internal geometry of the docking station 300 secures the electric scooter 100 from moving out of the docking station 300.

Figure 5B:
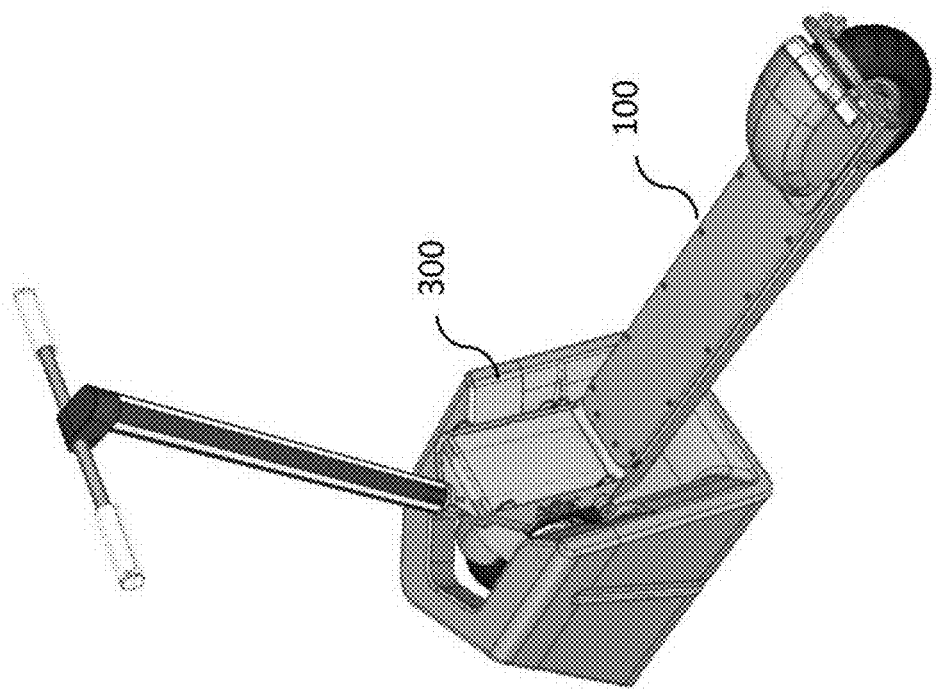
Figure 5A:
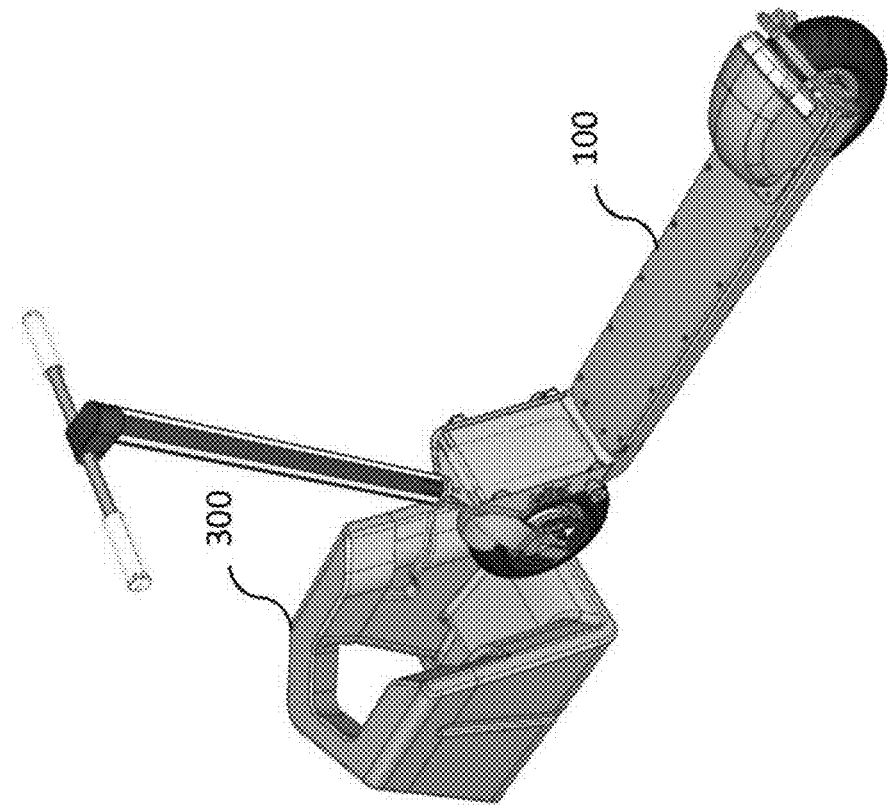

FIGS. 5A-5D are diagrams illustrating the entry of the electric scooter 100 into the single scooter docking station 300. The electric scooter 100, as depicted in FIG. 5A, approaches the docking station 300 and begins to travel up the entry ramp 330. In FIG. 5B, the electric scooter 100 travels on entry ramp 330 and over the ramp lip 347, moving into the rotation area of the docking station 300.

Figure 5C:
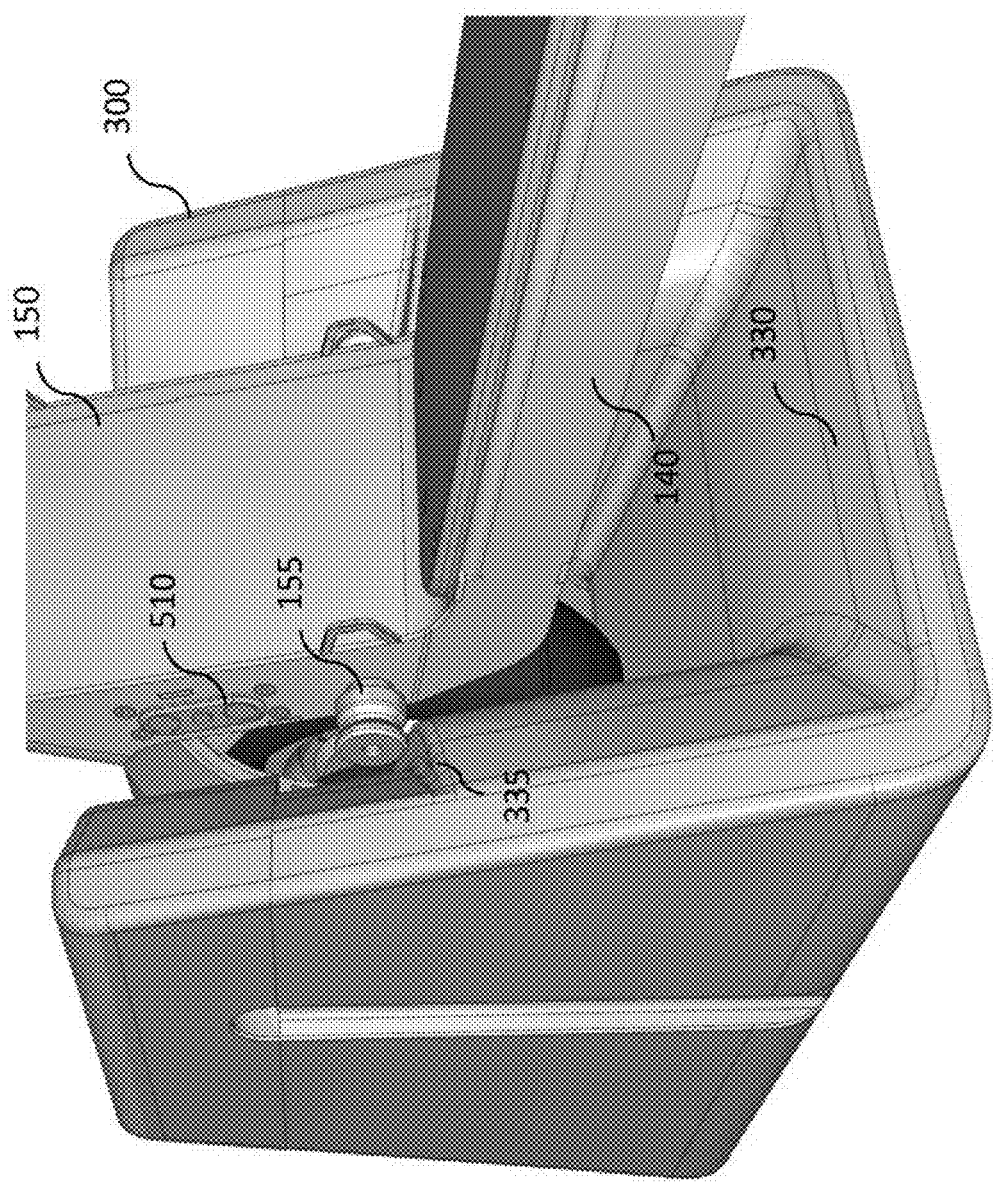

FIGS. 5C-5D depict the side channels 335 of the docking station 300 facilitating the reception of the charging ports 155 of the electric scooter 100 as the electric scooter 100 docks into the docking station 300. Further, electric contacts 510 of the electric scooter 100 are positioned to contact the charging contact 340 of the docking station 100. In some cases, the side channels 335 also support or hold the front of the scooter, causing the front wheel to lose contact with the ramp 330 and float within the rotation area (above the floor 345). Thus, while floating, the docking station 300 enables the turning of the steering tube (and front wheel) to accommodate the front wheel to be positioned below the locking component 320 when secured.

As described herein, the electric scooter 100 can include a wheel lock that, when in a locked position, prevents the front wheel from rotating when locked in an angled orientation, and thus the electric scooter 100 is secured within the docking station 300.

Figure 6A:
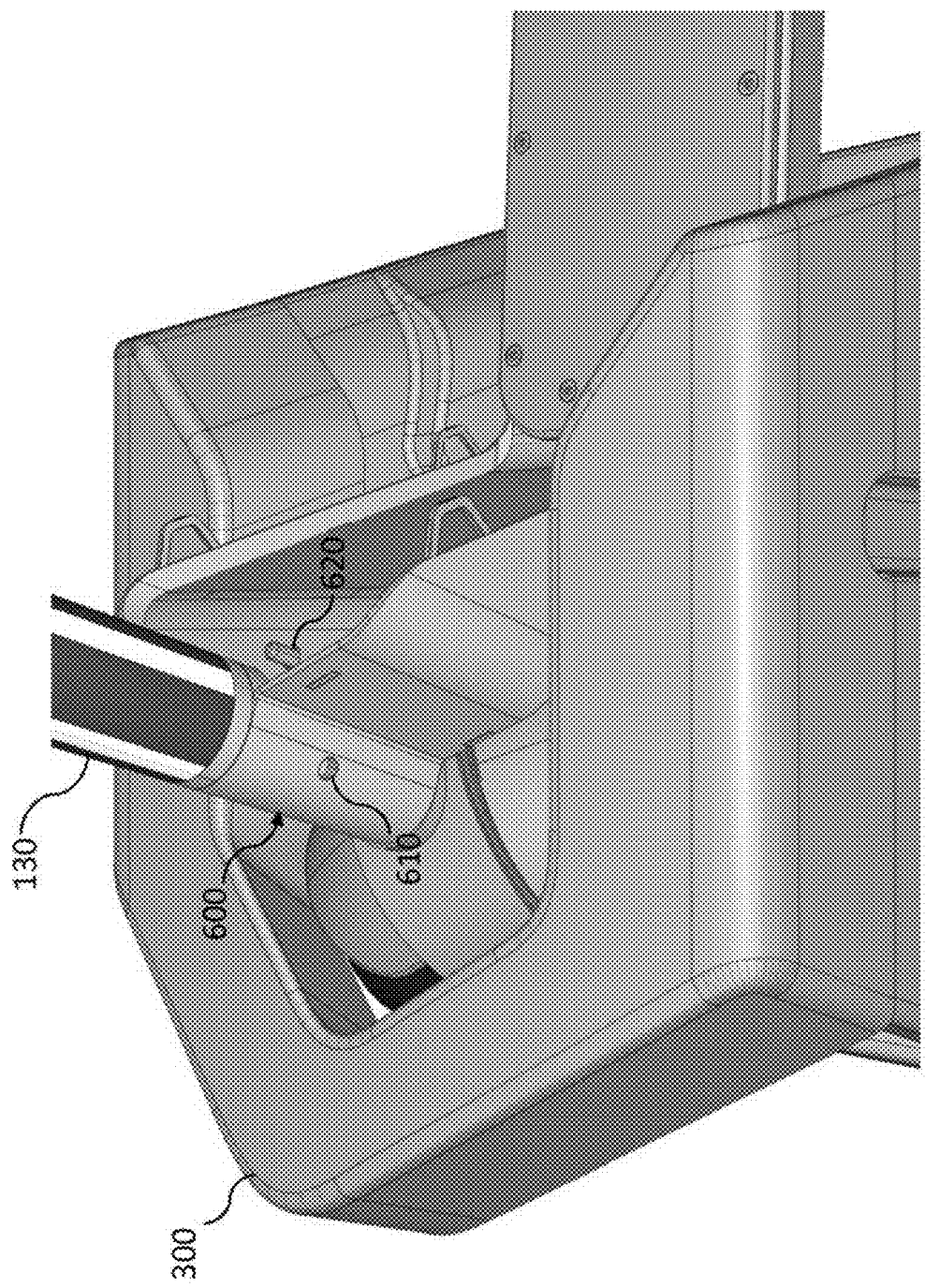
FIGS. 6A-6B are diagrams illustrating a wheel lock for an electric scooter.
Figure 6B:
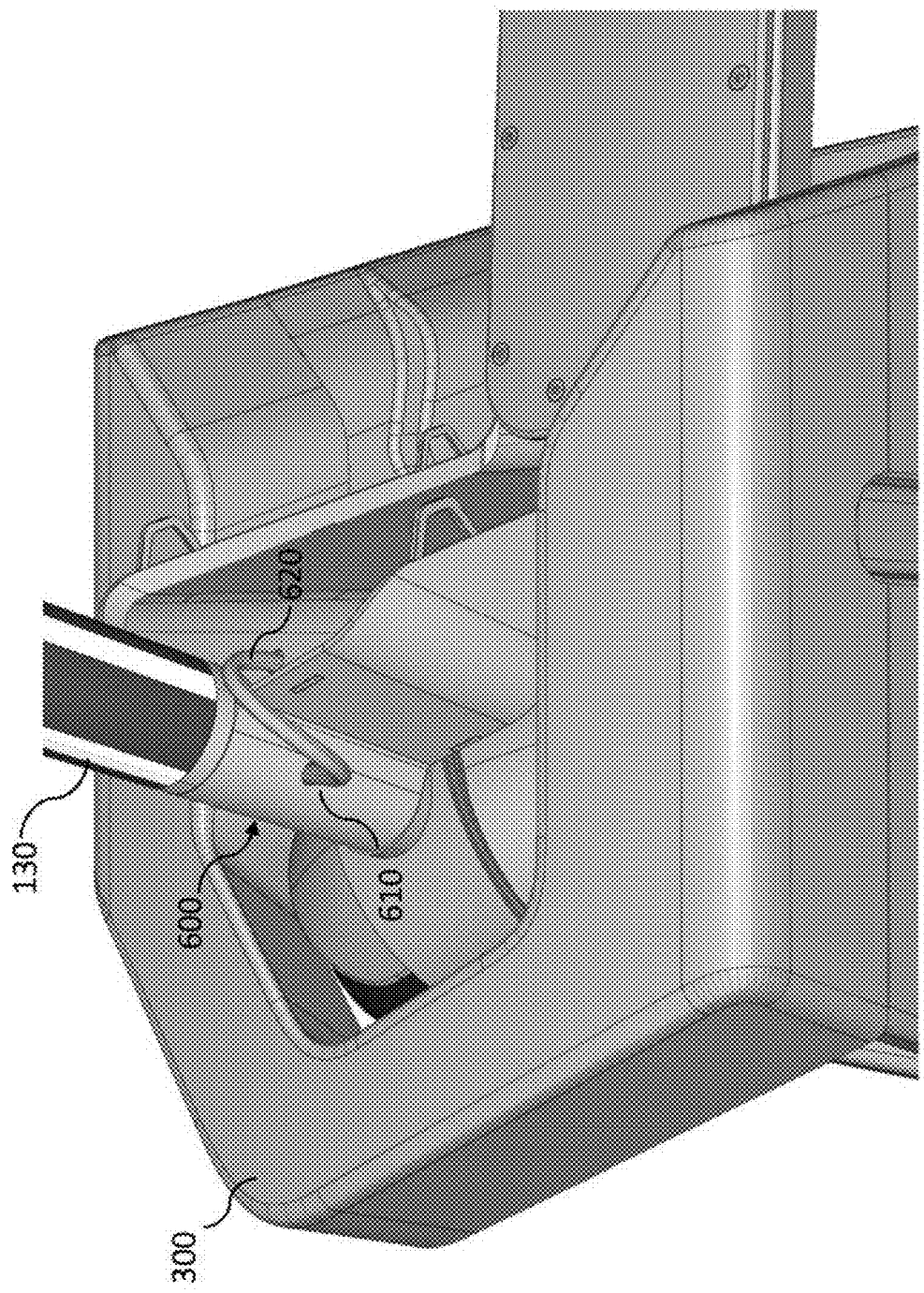

FIGS. 6A-6B are diagrams illustrating a wheel lock 600 for an electric scooter. The wheel lock 600 includes a locking cable 620, which plugs into a locking port 610 of the electric scooter 100. For example, when the locking cable 620 is pushed into the locking port 610, the wheel lock 600 prevents the steering tube 130 from rotating. When the locking cable 620 is not engaged with the locking port 610, the steering tube can rotate freely.

In some cases, the wheel lock 600 can be released or unlocked via a variety of mechanical mechanisms. For example, a user of the electric scooter 100 can utilize a key or other mechanical device or can provide a code or password. In addition, the wheel lock 600 can be released via input provided by the user to a mobile application associated with electric scooter 100 or the docking station 300, such as a mobile application for a scooter share service that deploys the electric scooter 100 via the docking station 300. The scooter 100 or docking station 300 can also include a user interface (e.g., touch screen) that facilitates entry of a code or password to unlock the electric scooter 100.

As described herein, the technology includes various docking station apparatuses and configurations. While depicted herein as different versions of a docking station, in some embodiments, components from different versions may be integrated together to realize other configurations for docking electric scooters.

Thus, in some embodiments, the technology described herein provides an electric scooter docking station that allows the electric scooter to be removed from the docking station when the electric scooter is in a non-rotated orientation and prevents the electric scooter to be removed from the docking station when the electric scooter is in a rotated orientation. The docking stations provide secure storage of an electric scooter (or, non-electric scooters) combined with easy removal and docking of the scooter, among other benefits. Also, the docking stations have a small footprint, and thus can be deployed in small or hard to access areas, among other benefits.

Conclusion

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of implementations of the system is not intended to be exhaustive or to limit the system to the precise form disclosed above. While specific implementations of, and examples for, the system are described above for illustrative purposes, various equivalent modifications are possible within the scope of the system, as those skilled in the relevant art will recognize. For example, some network elements are described herein as performing certain functions. Those functions could be performed by other elements in the same or differing networks, which could reduce the number of network elements. Alternatively, or additionally, network elements performing those functions could be replaced by two or more elements to perform portions of those functions. In addition, while processes, message/data flows, or blocks are presented in a given order, alternative implementations may perform routines having blocks, or employ systems having blocks, in a different order; and some processes or blocks may be deleted, moved, added, subdivided, combined, and/or modified to provide alternative or subcombinations. Each of these processes, message/data flows, or blocks may be implemented in a variety of different ways. Also, while processes or blocks are at times shown as being performed in series, these processes or blocks may instead be performed in parallel, or may be performed at different times. Further, any specific numbers noted herein are only examples: alternative implementations may employ differing values or ranges.

The teachings of the methods and system provided herein can be applied to other systems, not necessarily the system described above. The elements, blocks and acts of the various implementations described above can be combined to provide further implementations.

Any patents, applications and other references noted above, including any that may be listed in accompanying filing papers, are incorporated herein by reference. Aspects of the technology can be modified, if necessary, to employ the systems, functions, and concepts of the various references described above to provide yet further implementations of the technology.

These and other changes can be made to the invention in light of the above Detailed Description. While the above description describes certain implementations of the technology, and describes the best mode contemplated, no matter how detailed the above appears in text, the invention can be practiced in many ways. Details of the system may vary considerably in its implementation details, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the invention to the specific implementations disclosed in the specification, unless the above Detailed Description section explicitly defines such terms. Accordingly, the actual scope of the invention encompasses not only the disclosed implementations, but also all equivalent ways of practicing or implementing the invention under the claims.

We claim:

1. A docking station, comprising:
    a scooter entry section, wherein the scooter entry section includes:
        an entry ramp that facilitates entry of an electric scooter into the docking station; and
        side walls that surround the entry ramp to form an opening;
    a scooter locking section positioned proximate to the scooter entry section, wherein the scooter locking section includes:
        a rotation area that is configured to facilitate lateral rotation of a front wheel of an electric scooter when an electric scooter is positioned within the scooter locking section; and
        a locking component that is configured to prevent an electric scooter from being removed from the scooter locking section when an electric scooter is positioned within the scooter locking section and a front wheel of an electric scooter is locked in an angled orientation,
            wherein the locking component comprises a top bar that extends between the side walls and is configured to partially enclose the rotation area such that a front wheel of an electric scooter is fixed within the scooter locking section by the top bar.

2. The docking station of claim 1, wherein the side walls extend to surround the rotation area of the scooter locking section.

3. The docking station of claim 1, wherein the top bar has a V-shaped configuration.

4. The docking station of claim 1, wherein the V-Shaped configuration includes a long bar portion and a short bar portion, and
    wherein the short bar portion is configured to be positioned above a front wheel locked in an angled orientation.

5. The docking station of claim 1, wherein a floor of the entry ramp is at a level that is higher than a floor of the rotation area of the scooter locking section.

6. The docking station of claim 1, wherein an orientation of a floor of the entry ramp is at an angle that rises above a level of a floor of the rotation area of the scooter locking section.

7. The docking station of claim 1, wherein the opening positioned proximate to the rotation area.

8. The docking station of claim 1, wherein the rotation area is formed by:
    the side walls of the scooter entry section extending away from the entry ramp;
    the top bar, wherein the top bar attaches to the side walls and extends between the side walls to form an upper height of the rotation area; and
    a floor that attaches to the side walls and extends between the side walls to form a surface of the rotation area,
    wherein the floor is at a level that is lower than a level of the entry ramp of the scooter entry section.

9. The docking station of claim 1, further comprising:
    a charging contact, disposed on a surface of one of the side walls, that is configured to contact a charging port of an electric scooter when an electric scooter is docked in the docking station to facilitate charging a battery of an electric scooter by the docking station.

10. The docking station of claim 1, further comprising:
    side channels disposed within the side walls of the scooter entry section and configured to receive a charging port of an electric scooter when an electric scooter travels through the docking station.

11. The docking station of claim 1, further comprising:
    a base that prevents removal of the docking station from a location within which the docking station provides docking for electric scooters.

12. The docking station of claim 1, wherein the scooter locking section has an internal geometry that:
    allows an electric scooter to be removed from the rotation area when an electric scooter is in a non-rotated orientation; and
    prevents an electric scooter to be removed from the rotation area when an electric scooter is in a rotated orientation.

13. The docking station of claim 1, wherein the rotation area facilitates lateral rotation of a front wheel of an electric scooter an at angle of 0-45 degrees from an axis defined by an electric scooter.

* * * * *